United States Patent
Diddekunta et al.

(10) Patent No.: US 9,946,784 B2
(45) Date of Patent: Apr. 17, 2018

(54) DATA CACHE ARCHITECTURE

(71) Applicant: Bank of America Corporation, Charlotte, NC (US)

(72) Inventors: Vijay Diddekunta, Edison, NJ (US); Yueking Yu, Yardley, PA (US)

(73) Assignee: Bank of America Corporation, Charlotte, NC (US)

( * ) Notice: Subject to any disclaimer, the term of this patent is extended or adjusted under 35 U.S.C. 154(b) by 730 days.

(21) Appl. No.: 14/528,981

(22) Filed: Oct. 30, 2014

(65) Prior Publication Data
US 2016/0125012 A1    May 5, 2016

(51) Int. Cl.
 *G06F 17/30*   (2006.01)
(52) U.S. Cl.
 CPC .. *G06F 17/30607* (2013.01); *G06F 17/30339* (2013.01); *G06F 17/30864* (2013.01)
(58) Field of Classification Search
 None
 See application file for complete search history.

(56) References Cited

U.S. PATENT DOCUMENTS

| | | | | |
|---|---|---|---|---|
| 6,151,602 A * | 11/2000 | Hejlsberg | ............ | G06F 17/3056 |
| 6,658,407 B1 * | 12/2003 | Bailey | ............... | G06F 17/30398 |
| 9,111,284 B2 * | 8/2015 | Noirot-Nerin | ......... | G06Q 30/02 |
| 2012/0290595 A1 * | 11/2012 | Kreindler | .......... | G06F 17/30374 |
| | | | | 707/756 |

\* cited by examiner

*Primary Examiner* — Jau-Shya Meng
(74) *Attorney, Agent, or Firm* — Banner & Witcoff, Ltd.; Michael A. Springs (57) ABSTRACT

A computing platform may receive data identifying one or more sets of fields of a database. The computing platform may, for each record of a plurality of records of the database, instantiate one or more objects corresponding to the one or more sets and comprising values stored in the fields for the record, and may store, amongst a plurality of objects associated with the database, the one or more objects. In addition, the computing platform may instantiate: an object for the record; for each set of the one or more sets, an object for the set; and for each field of the set, an object for the field.

15 Claims, 6 Drawing Sheets

DATA CACHE ARCHITECTURE

BACKGROUND

Organizations utilize numerous different computing systems, for example, to maintain records, support internal and external communication and collaboration, analyze data regarding aspects of their operations, and the like. Such computing systems often generate, store, and utilize vast quantities of data. Many computing systems store such data in relational databases. Relational databases are often chosen because they can be structured in a way that maintains the integrity of the data and supports expansion (e.g., the inclusion of new types of data). While their structure can allow relational databases to maintain data integrity and support expansion, it can also make accessing data, particularly certain subsets of the data, inefficient. Accordingly, a need exists for a data cache architecture.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing platform may receive data identifying one or more sets of fields of a database. The computing platform may, for each record of a plurality of records of the database, instantiate one or more objects corresponding to the one or more sets and comprising values stored in the fields for the record, and may store, amongst a plurality of objects associated with the database, the one or more objects. In some embodiments, the computing platform may instantiate: an object for the record; for each set of the one or more sets, an object for the set; and for each field of the set, an object for the field.

In some embodiments, the computing platform may populate the object for the field with a value stored in the field for the record. In such embodiments, the computing platform may populate the object for the field with data indicating a time at which the object for the field was populated with the value.

In some embodiments, the computing platform may populate: for each record of the plurality of records, an object, of the one or more objects, that corresponds to the record with a value corresponding to the record; and for each set of the one or more sets: an object, of the one or more objects, that corresponds to the set with the value corresponding to the record, and for each field of the set, an object, of the one or more objects, that corresponds to the field, with the value corresponding to the record. In some embodiments, for each record of the plurality of records: the object that corresponds to the record may comprise, for each set of the one or more sets, the object that corresponds to the set; and for each set of the one or more sets, the object that corresponds to the set may inherit from the object that corresponds to the record the value corresponding to the record and may comprise, for each field of the set, the object that corresponds to the field. In such embodiments, for each field of the set, the object that corresponds to the field may inherit from the object that corresponds to the set the value corresponding to the record.

In some embodiments, the computing platform may receive, from a computing device, a request for a value stored in a particular field of the one or more sets for a particular record of the plurality of records. The computing platform may identify, from amongst the plurality of objects, an object comprising the value, and may communicate, to the computing device, the value.

In some embodiments, the computing platform may identify, based on data in the request, an object corresponding to the particular record. The object corresponding to the particular record may comprise multiple objects each of which may correspond to a different set of the one or more sets. The computing platform may identify, from amongst the multiple objects, an object corresponding to a set, of the one or more sets, comprising the particular field. The object corresponding to the set may comprise an object corresponding to the particular field, which may comprise the value. In some embodiments, the computing platform may invoke a function, of the object corresponding to the particular field, configured to return the value.

In some embodiments, the computing platform may receive a request to store a value to a particular field of the one or more sets for a particular record of the plurality of records. The computing platform may store, in a table of the database, the value in the particular field for the particular record. The computing platform may identify, from amongst the plurality of objects, an object corresponding to the particular field for the particular record. The computing platform may store, in the object corresponding to the particular field for the particular record, the value.

In some embodiments, the computing platform may identify, based on data in the request, an object corresponding to the particular record. The object corresponding to the particular record may comprise multiple objects each of which may correspond to a different set of the one or more sets. The computing platform may identify, from amongst the multiple objects, an object corresponding to a set, of the one or more sets, comprising the particular field. The object corresponding to the set may comprise the object corresponding to the particular field for the particular record. In some embodiments, the computing platform may invoke a function, of the object corresponding to the particular field for the particular record, configured to write the value to the object corresponding to the particular field for the particular record. In such embodiments, the computing platform may pass, via the function, the value to the object corresponding to the particular field for the particular record.

In some embodiments, the computing platform may store, in the object corresponding to the particular field for the particular record, data indicating a time at which the object corresponding to the particular field for the particular record was populated with the value. In such embodiments, responsive to a determination by the computing platform that the time at which the object corresponding to the particular field for the particular record was populated with the value is earlier in time than a time at which a table, of the database, comprising the particular field for the particular record was populated with a different value, the computing platform: may identify, from amongst the plurality of objects, the object corresponding to the particular field for the particular record; and may store, in the object corresponding to the particular field for the particular record, the different value.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
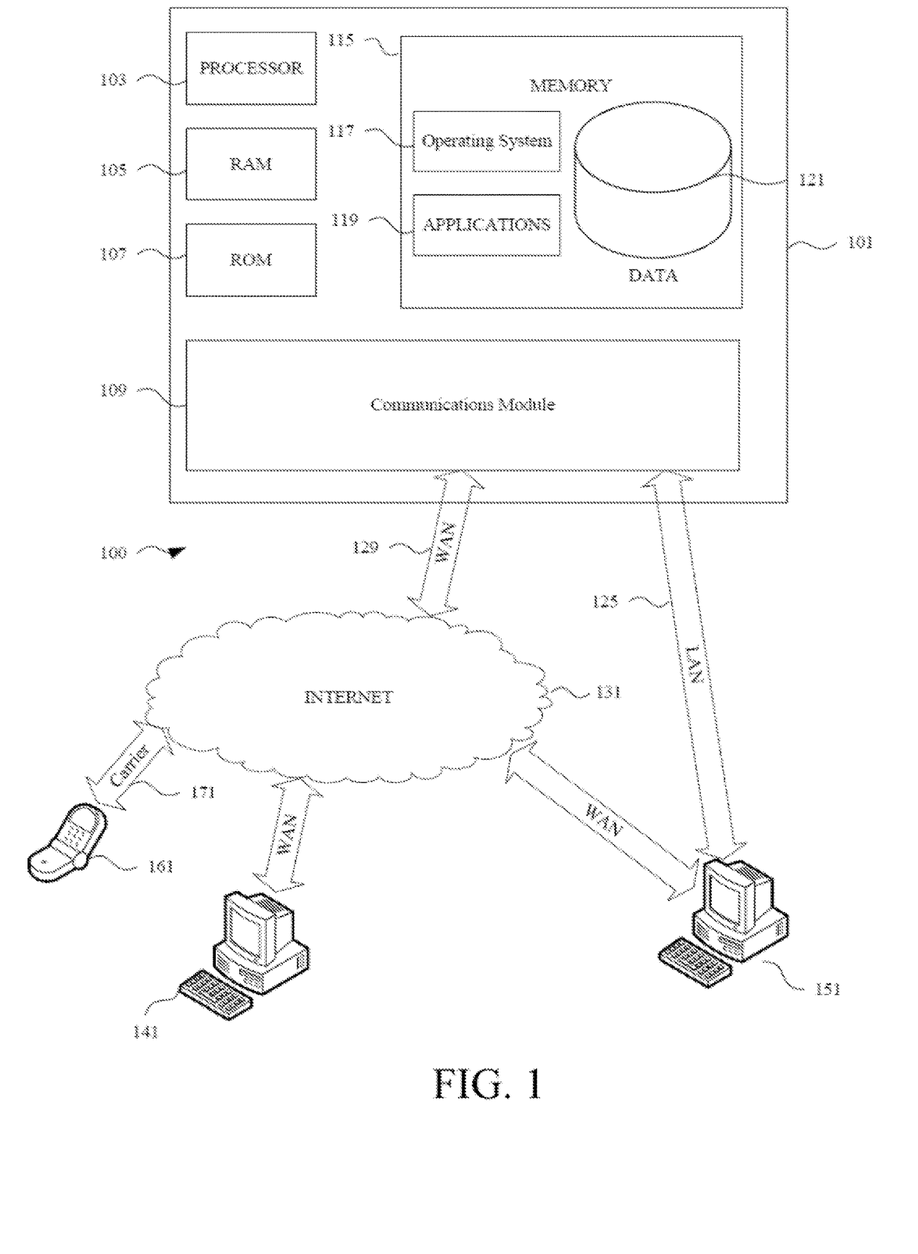
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
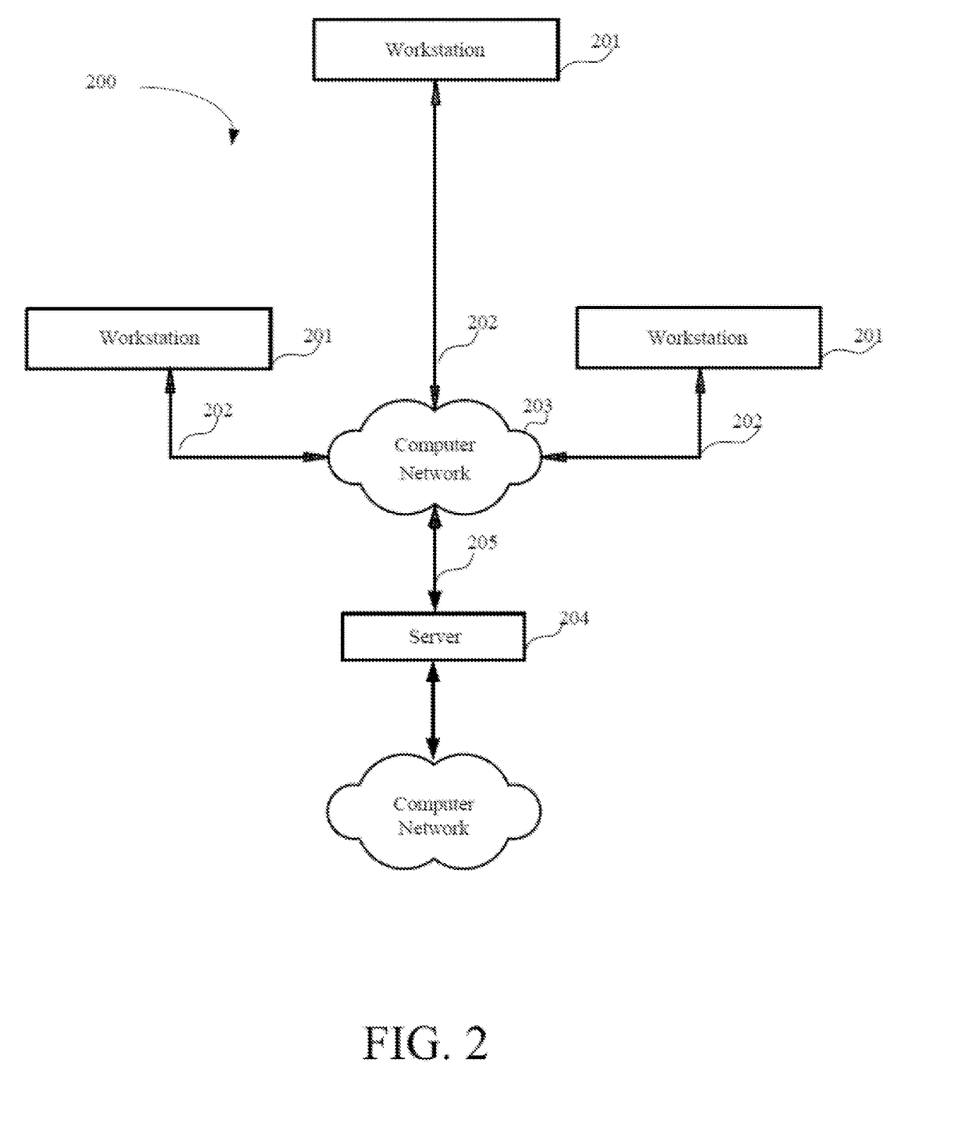
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
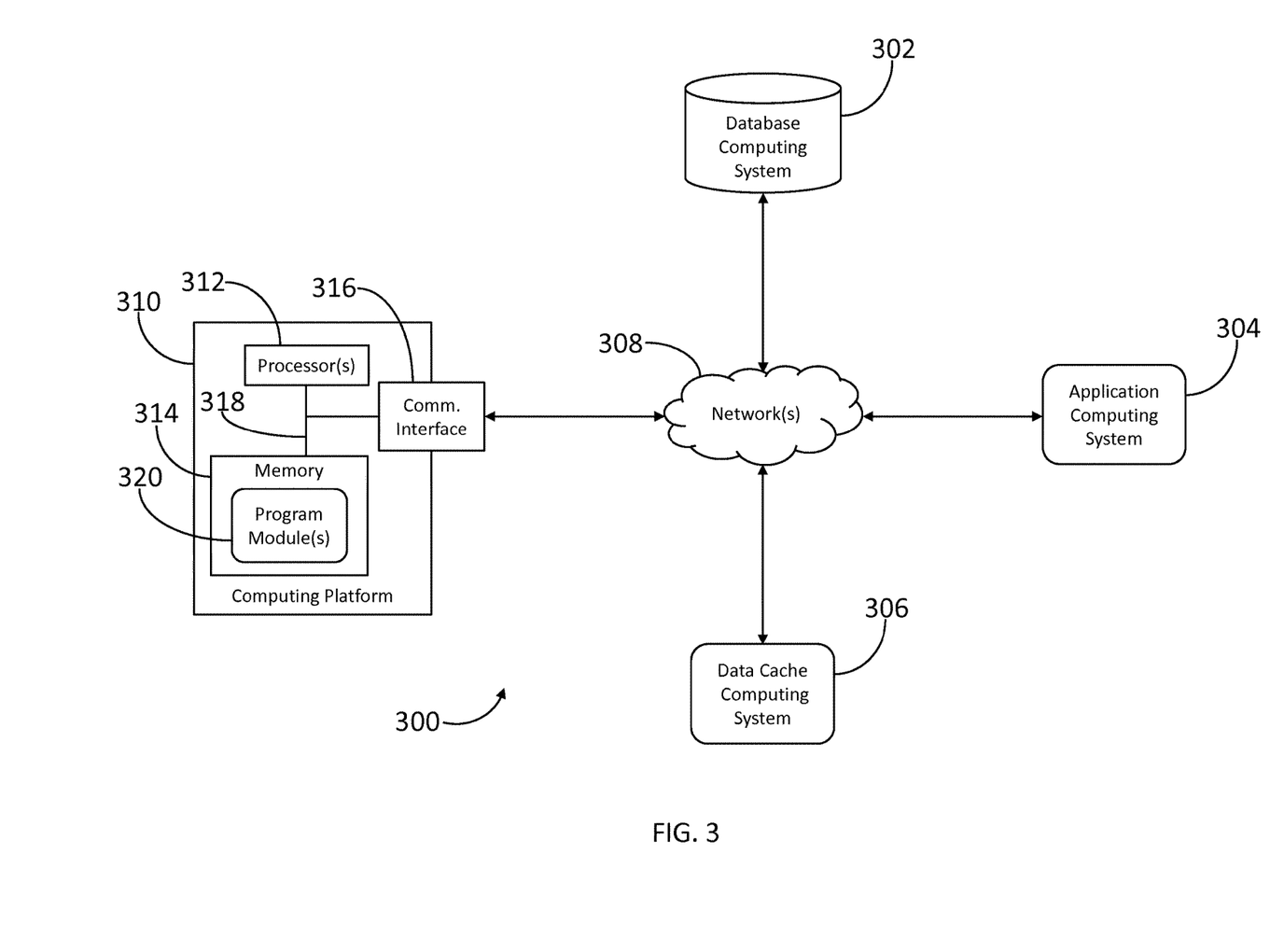
FIG. 3 depicts an illustrative computing environment for implementing a data cache architecture in accordance with one or more example embodiments.

FIG. 3 depicts an illustrative computing environment for implementing a data cache architecture in accordance with one or more example embodiments. Referring to FIG. 3, computing environment 300 may be associated with an organization (e.g., a corporation, university, government entity, financial institution, or the like) and may include one or more computing systems. For example, computing environment 300 may include database computing system 302, application computing system 304, and data cache computing system 306. Database computing system 302, application computing system 304, and/or data cache computing system 306 may include one or more of any type of computing device (e.g., desktop computer, laptop computer, tablet computer, smart phone, server, server blade, mainframe, virtual machine, or the like) configured to perform one or more of the functions described herein. Computing environment 300 may also include one or more networks.

For example, computing environment 300 may include network(s) 308, which may include one or more sub-networks (e.g., LANs, WANs, VPNs, or the like) and may interconnect one or more of database computing system 302, application computing system 304, and data cache computing system 306.

Computing environment 300 may also include one or more computing platforms. For example, computing environment 300 may include computing platform 310. Computing platform 310 may include one or more of any type of computing device (e.g., desktop computer, laptop computer, tablet computer, smart phone, server, server blade, mainframe, virtual machine, or the like) configured to perform one or more of the functions described herein. In some embodiments, computing platform 310 may include one or more of database computing system 302, application computing system 304, or data cache computing system 306. Computing platform 310 may include one or more processor(s) 312, memory 314, communication interface 316, and/or data bus 318. Data bus 318 may interconnect processor(s) 312, memory 314, and/or communication interface 316. Communication interface 316 may be a network interface configured to support communication between computing platform 310 and network(s) 308 (or one or more sub-networks thereof). Memory 314 may include one or more program modules comprising instructions that when executed by processor(s) 312 cause computing platform 310 to perform one or more functions described herein. For example, memory 314 may include program module(s) 320, which may comprise instructions that when executed by processor(s) 312 cause computing platform 310 to perform one or more functions described herein.

Figure 4:
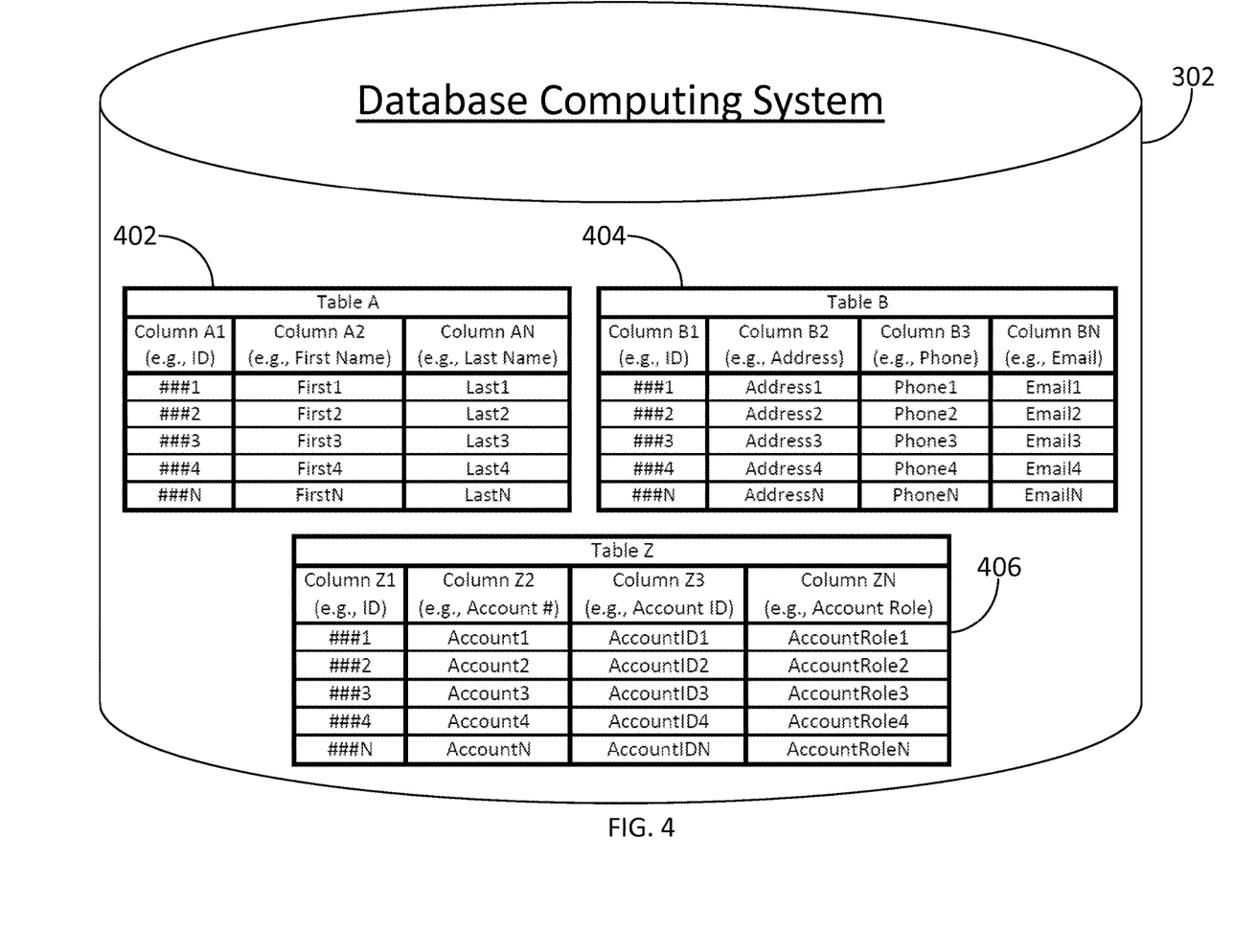
FIG. 4 depicts an illustrative database for implementing a data cache architecture in accordance with one or more example embodiments.

FIG. 4 depicts an illustrative database for implementing a data cache architecture in accordance with one or more example embodiments. Referring to FIG. 4, database computing system 302 may maintain a database (e.g., a relational database) comprising one or more tables. For example, database computing system 302 may maintain a database comprising table 402 (e.g., Table A), table 404 (e.g., Table B), and table 406 (e.g., Table Z). Table 402, table 404, and table 406 may each comprise a plurality of fields (e.g., corresponding to columns) and a plurality of records (e.g., corresponding to rows). Each record (or row) may comprise a value (or data) (e.g., a number, text string, or the like) for each field (or column).

For example, table 402 may comprise: three fields, a field corresponding to column A1 (e.g., ID), a field corresponding to column A2 (e.g., First Name), and a field corresponding to column AN (e.g., Last Name); and five records, each of which may include values for one or more of the fields corresponding to columns A1, A2, or AN (e.g., a record having the value "###1" for the field corresponding to column A1, the value "First1" for the field corresponding to column A2, and the value "Last1" for the field corresponding to column AN; a record having the value "###2" for the field corresponding to column A1, the value "First2" for the field corresponding to column A2, and the value "Last2" for the field corresponding to column AN; a record having the value "###3" for the field corresponding to column A1, the value "First3" for the field corresponding to column A2, and the value "Last3" for the field corresponding to column AN; a record having the value "###4" for the field corresponding to column A1, the value "First4" for the field corresponding to column A2, and the value "Last4" for the field corresponding to column AN; and a record having the value "###N" for the field corresponding to column A1, the value "FirstN" for the field corresponding to column A2, and the value "LastN" for the field corresponding to column AN).

Similarly, table 404 may comprise: four fields, a field corresponding to column B1 (e.g., ID), a field corresponding to column B2 (e.g., Address), a field corresponding to column B3 (e.g., Phone), and a field corresponding to column BN (e.g., Email); and five records, each of which may include values for one or more of the fields corresponding to columns B1, B2, B3, or BN (e.g., a record having the value "###1" for the field corresponding to column B1, the value "Address1" for the field corresponding to column B2, the value "Phone1" for the field corresponding to column B3, and the value "Email1" for the field corresponding to column BN; a record having the value "###2" for the field corresponding to column B1, the value "Address2" for the field corresponding to column B2, the value "Phone2" for the field corresponding to column B3, and the value "Email2" for the field corresponding to column BN; a record having the value "###3" for the field corresponding to column B1, the value "Address3" for the field corresponding to column B2, the value "Phone3" for the field corresponding to column B3, and the value "Email3" for the field corresponding to column BN; a record having the value "###4" for the field corresponding to column B1, the value "Address4" for the field corresponding to column B2, the value "Phone4" for the field corresponding to column B3, and the value "Email4" for the field corresponding to column BN; and a record having the value "###N" for the field corresponding to column B1, the value "AddressN" for the field corresponding to column B2, the value "PhoneN" for the field corresponding to column B3, and the value "EmailN" for the field corresponding to column BN); and table 406 may comprise: four fields, a field corresponding to column Z1 (e.g., ID), a field corresponding to column Z2 (e.g., Account#), a field corresponding to column Z3 (e.g., Account ID), and a field corresponding to column ZN (e.g., Account Role); and five records, each of which may include values for one or more of the fields corresponding to columns Z1, Z2, Z3, or ZN (e.g., a record having the value "###1" for the field corresponding to column Z1, the value "Account1" for the field corresponding to column Z2, the value "AccountID1" for the field corresponding to column Z3, and the value "AccountRole1" for the field corresponding to column ZN; a record having the value "###2" for the field corresponding to column Z1, the value "Account2" for the field corresponding to column Z2, the value "AccountID2" for the field corresponding to column Z3, and the value "AccountRole2" for the field corresponding to column ZN; a record having the value "###3" for the field corresponding to column Z1, the value "Account3" for the field corresponding to column Z2, the value "AccountID3" for the field corresponding to column Z3, and the value "AccountRole3" for the field corresponding to column ZN; a record having the value "###4" for the field corresponding to column Z1, the value "Account4" for the field corresponding to column Z2, the value "AccountID4" for the field corresponding to column Z3, and the value "AccountRole4" for the field corresponding to column ZN; and a record having the value "###N" for the field corresponding to column Z1, the value "AccountN" for the field corresponding to column Z2, the value "AccountIDN" for the field corresponding to column Z3, and the value "AccountRoleN" for the field corresponding to column ZN).

One or more fields of table 402, table 404, or table 406 may correspond to a field of another table of table 402, table 404, or table 406 and may serve as a special purpose field (or key) for the database, which may support one or more database operations (e.g., table joins, or the like). For example, the field corresponding to column A1 (e.g., ID) may correspond to the field corresponding to column B1 (e.g., ID) and the field corresponding to column Z1 (e.g., ID). Such a special purpose field (or key) may interrelate (or associate) a record stored in one of the database's tables with one or more other records stored in another of the database's tables.

For example, the record having the value "###1" for the field corresponding to column A1 may be associated (e.g., via the fields corresponding to columns A1, B1, and Z1) with the record having the value "###1" for the field corresponding to column B1 and the record having the value "###1" for the field corresponding to column Z1. Similarly, the record having the value "###2" for the field corresponding to column A1 may be associated (e.g., via the fields corresponding to columns A1, B1, and Z1) with the record having the value "###2" for the field corresponding to column B1 and the record having the value "###2" for the field corresponding to column Z1; the record having the value "###3" for the field corresponding to column A1 may be associated (e.g., via the fields corresponding to columns A1, B1, and Z1) with the record having the value "###3" for the field corresponding to column B1 and the record having the value "###3" for the field corresponding to column Z1; the record having the value "###4" for the field corresponding to column A1 may be associated (e.g., via the fields corresponding to columns A1, B1, and Z1) with the record having the value "###4" for the field corresponding to column B1 and the record having the value "###4" for the field corresponding to column Z1; and the record having the value "###N" for the field corresponding to column A1 may be associated (e.g., via the fields corresponding to columns A1, B1, and Z1) with the record having the value "###N" for the field corresponding to column B1 and the record having the value "###N" for the field corresponding to column Z1.

Figure 5:
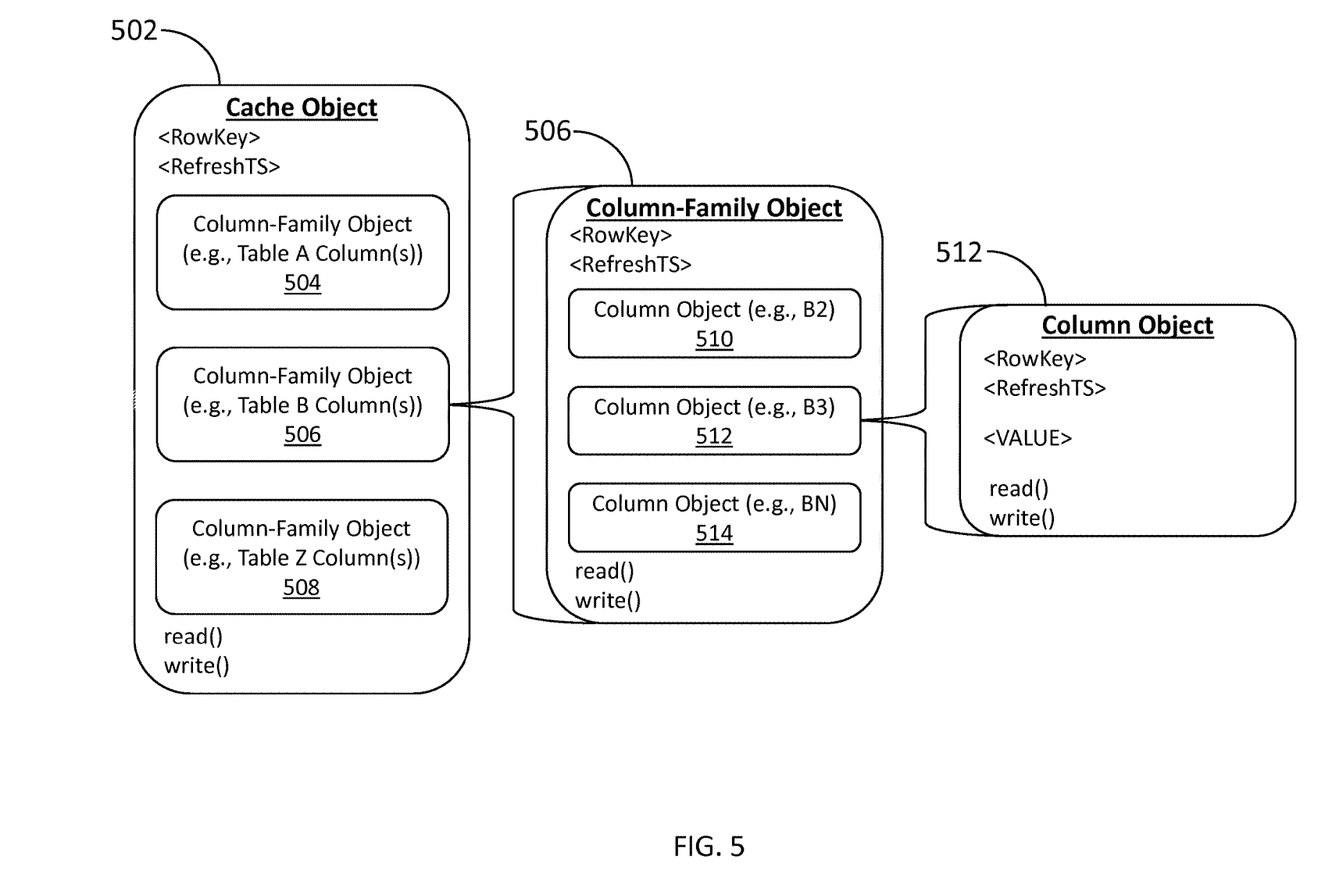
FIG. 5 depicts illustrative data structures for implementing a data cache architecture in accordance with one or more example embodiments.

FIG. 5 depicts illustrative data structures for implementing a data cache architecture in accordance with one or more example embodiments. Referring to FIG. 5, a cache object type may be defined (e.g., via a class, or the like) for a record of the database and instantiated into objects corresponding to one or more records of the database. For example, a cache object type may defined for a record of the database comprising table 402, table 404, and table 406, and cache object 502 may be instantiated for the record in table 402 having the value "###1" for the field corresponding to column A1, the record in table 404 having the value "###1" for the field corresponding to column B1, and the record in table 406 having the value "###1" for the field corresponding to column Z1. The cache object type may include a key value variable (e.g., for a record key, row key, or the like). In some embodiments, the key value variable may be defined for a key value comprising a value from a special purpose field (or key) that interrelates records of the database, as described above with respect to FIG. 4. For example, cache object 502 may comprise a key variable with the value "###1." Additionally or alternatively, the key value variable may be defined for a key value comprising a value that identifies and/or interrelates records of the database but is different from such a special purpose field (or key) of the database. For example, cache object 502 may comprise a key variable with a value different from "###1." Cache object 502 may also include a variable for storing data (e.g., a timestamp) indicating a time when one or more values were stored in cache object 502 and/or when cache object 502 was populated with one or more values, or the like. Cache object 502 may further include one or more functions (e.g., methods, or the like) for reading data from and/or writing data to cache object 502.

An instance of the cache object type may comprise one or more objects corresponding to one or more sets of fields (e.g., column families) of the database. For example, cache object 502 may comprise: object 504, which may correspond to a set of fields from table 402 (e.g., fields corresponding to columns A2 and AN); object 506, which may correspond to a set of fields from table 404 (e.g., fields corresponding to columns B2, B3, and BN); and object 508, which may correspond to a set of fields from table 406 (e.g., fields corresponding to columns Z2, Z3, and ZN). In some embodiments, each set of fields may comprise fields from a common table of the database. Additionally or alternatively, one or more of the sets may comprise fields from different tables of the database (e.g., a set comprising fields corresponding to columns A2, AN, and Z2).

Each object corresponding to a set of fields (e.g., column family) may comprise an object for each field (e.g., column) in the set (e.g., family). For example, referring to the detailed view of object 506, object 506 may comprise: object 510, corresponding to the field corresponding to column B2; object 512, corresponding to the field corresponding to column B3; and object 514, corresponding to the field corresponding to column BN. Object 506 may also comprise a key value variable, which may comprise a value that identifies and/or interrelates the record(s) corresponding to object 506. In some embodiments, object 506 may inherit this value from cache object 502. Object 506 may also include a variable comprising data (e.g., a timestamp) indicating a time when one or more values were stored in object 506 and/or when object 506 was populated with one or more values, or the like. Object 506 may further include one or more functions (e.g., methods, or the like) for reading data from and/or writing data to object 506.

The object for each field in the set may comprise a value, from the field, for the record(s) corresponding the object. For example, referring to the detailed view of object 512, object 512 may comprise a value from the field corresponding to column B3 (e.g., "Phone1"). Object 512 may also comprise a key value variable, which may comprise a value that identifies and/or interrelates the records corresponding to object 512. In some embodiments, object 512 may inherit this value from object 506. Object 512 may also include a variable comprising data (e.g., a timestamp) indicating a time when one or more values were stored in object 512 and/or when object 512 was populated with one or more values, or the like. Object 512 may further include one or more functions (e.g., methods, or the like) for reading data from and/or writing data to object 512.

Figure 6:
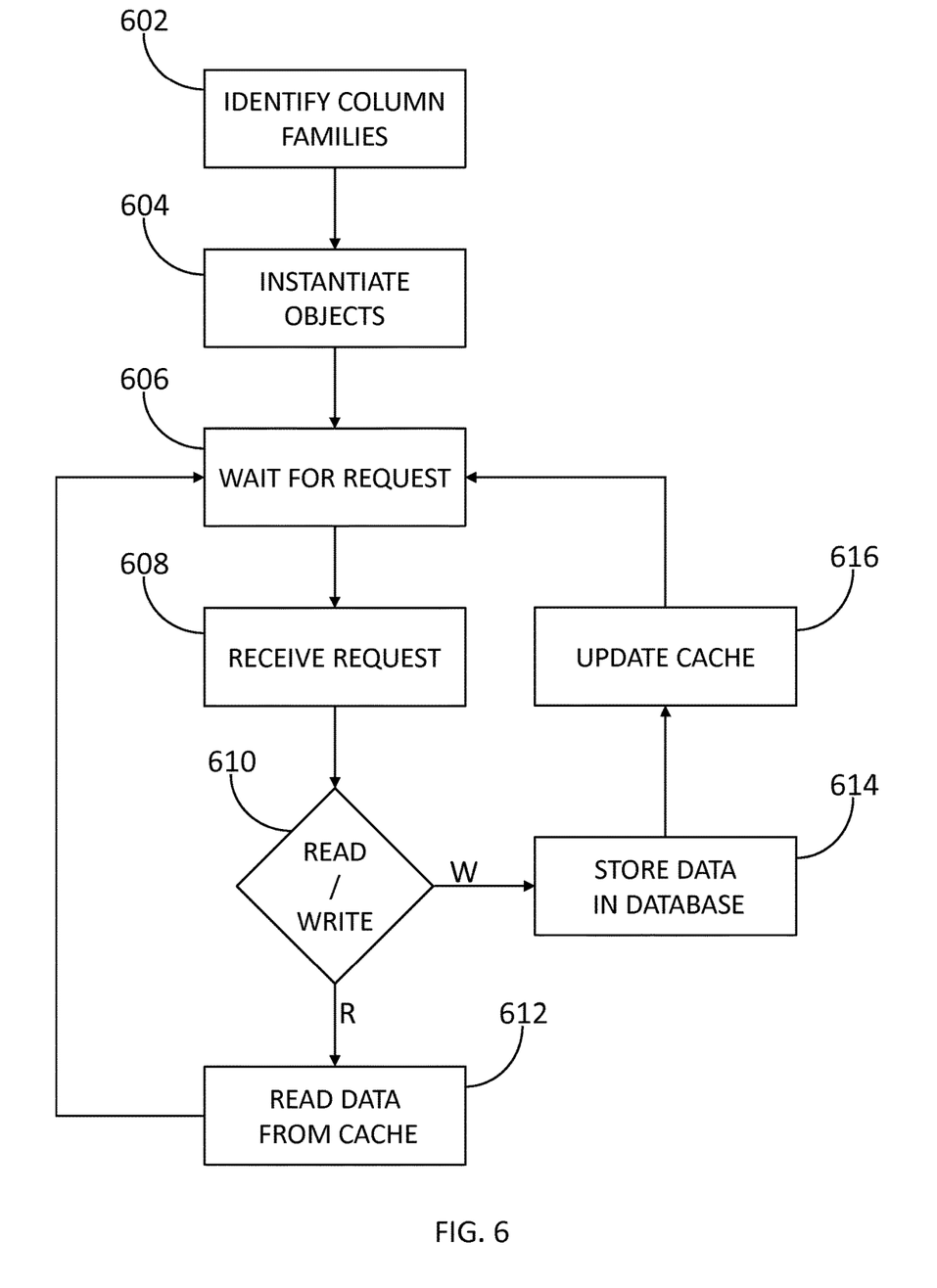
FIG. 6 depicts multiple illustrative methods for implementing a data cache architecture in accordance with one or more example embodiments.

FIG. 6 depicts multiple illustrative methods for implementing a data cache architecture in accordance with one or more example embodiments. Referring to FIG. 6, at step 602, computing platform 310 may identify one or more sets of fields of a database. For example, application computing system 304 may utilize particular set(s) of fields of a database stored on database computing system 302 (e.g., a set of fields corresponding to columns A2 and AN, a set of fields corresponding to columns B2, B3, and BN, and a set of fields corresponding to columns Z2, Z3, and ZN), may generate data identifying the particular set(s) of fields, and may communicate the data to computing platform 310, which may receive (e.g., via communication interface 316) the data and identify the particular set(s) of fields based on the data. At step 604, computing platform 310 may, for each record of a plurality of records of the database, instantiate one or more objects corresponding to the one or more sets and comprising values stored in the fields for the record, and may store, amongst a plurality of objects associated with the database, the one or more objects. For example, computing platform 310 may instantiate cache object 502 for the record in table 402 having the value "###1" for the field corresponding to column A1, the record in table 404 having the value "###1" for the field corresponding to column B1, and the record in table 406 having the value "###1" for the field corresponding to column Z1.

Similarly, computing platform 310 may instantiate: an object similar to cache object 502 for the record in table 402 having the value "###2" for the field corresponding to column A1, the record in table 404 having the value "###2" for the field corresponding to column B1, and the record in table 406 having the value "###2" for the field corresponding to column Z1; an object similar to cache object 502 for the record in table 402 having the value "###3" for the field corresponding to column A1, the record in table 404 having the value "###3" for the field corresponding to column B1, and the record in table 406 having the value "###3" for the field corresponding to column Z1; an object similar to cache object 502 for the record in table 402 having the value "###4" for the field corresponding to column A1, the record in table 404 having the value "###4" for the field corresponding to column B1, and the record in table 406 having the value "###4" for the field corresponding to column Z1; and an object similar to cache object 502 for the record in table 402 having the value "###Z" for the field corresponding to column A1, the record in table 404 having the value "###Z" for the field corresponding to column B1, and the record in table 406 having the value "###Z" for the field corresponding to column Z1 ("the other cache objects").

Computing platform 310 may store cache object 502, as well as the other cache objects, in data cache computing system 306 (e.g., amongst a plurality of objects associated with the database stored on database computing system 302).

As indicated above, the object for each field in the set may comprise a value, from the field, for the record(s) corresponding the object and a variable comprising data (e.g., a timestamp) indicating a time when the object was populated with one or more values, which may be populated by computing platform 310. For example, computing platform 310 may populate object 512 with a value from the field corresponding to column B3 (e.g., "Phone1") and data (e.g., a timestamp) indicating a time when object 512 was populated. Similarly, computing platform 310 may populate the objects for each field for each of the other cache objects. Additionally, as indicated above, each cache object may include a key value variable for storing data identifying and/or interrelating its corresponding record(s), and computing platform 310 may populate this key value variable for cache object 502 (e.g., with data identifying and/or interrelating its corresponding records (e.g., the record in table 402 having the value "###1" for the field corresponding to column A1, the record in table 404 having the value "###1" for the field corresponding to column B1, and the record in table 406 having the value "###1" for the field corresponding to column Z1), as well as for each of the other cache objects with data identifying and/or interrelating their corresponding records.

At step 606, computing platform 310 may wait for a request pertaining to the data stored in the database stored on database computing system 302. At step 608, computing platform 310 may receive (e.g., via communication interface 316) a request pertaining to the data stored in the database stored on database computing system 302 (e.g., from application computing system 304). At step 610, computing platform 310 may determine whether the request is a request for data stored in the database (e.g., a read request) or a request to store data in the database (e.g., a write request). For example, computing platform 310 may receive, from application computing system 304, a request for a value stored in a particular field (e.g., the field corresponding to column B3) for a particular record of the plurality of records (e.g., the record in table 404 having the value "###1" for the field corresponding to column B1). Computing platform 310 may determine that the request is a request for data stored in the database (e.g., a read request) and, at step 612, may read the requested data from data cache computing system 306 and communicate (e.g., via communication interface 316) the requested data to application computing system 304. For example, computing platform 310 may identify, based on data in the request (e.g., data identifying the record in table 404 having the value "###1" for the field corresponding to column B1), cache object 502 (e.g., the cache object corresponding to the record in table 404 having the value "###1" for the field corresponding to column B1), object 506 (e.g., the object corresponding to the fields corresponding to columns B2, B3, and BN), and object 512 (e.g., the object with the value from the field corresponding to column B3 (e.g., "Phone1")). Computing platform 310 may invoke a function of object 512 configured to return the value (e.g., the value from the field corresponding to column B3 (e.g., "Phone1")), which computing platform 310 may communicate to application computing system 304. Computing platform 310 may then return to step 606 to wait for another request pertaining to the data stored in the database stored on database computing system 302.

At step 608, computing platform 310 may receive (e.g., via communication interface 316) another request pertaining to the data stored in the database stored on database computing system 302 (e.g., from application computing system 304). At step 610, computing platform 310 may determine whether the request is a request for data stored in the database (e.g., a read request) or a request to store data in the database (e.g., a write request). For example, computing platform 310 may receive, from application computing system 304, a request to store a value (e.g., "Phone1_ver2") to a particular field (e.g., the field corresponding to column B3) for a particular record of the plurality of records (e.g., the record in table 404 having the value "###1" for the field corresponding to column B1). Computing platform 310 may determine that the request is a request to store data in the database (e.g., a write request) and, at step 614, may store the value (e.g., "Phone1_ver2") in table 404 of the database stored on database computing system 302. At step 616, computing platform 310, may update one or more of the plurality of objects stored on data cache computing system 306 with the value stored in step 614. For example, computing platform 310 may identify, based on data in the request (e.g., data identifying the record in table 404 having the value "###1" for the field corresponding to column B1), cache object 502 (e.g., the cache object corresponding to the record in table 404 having the value "###1" for the field corresponding to column B1), object 506 (e.g., the object corresponding to the fields corresponding to columns B2, B3, and BN), and object 512 (e.g., the object with the value from the field corresponding to column B3 (e.g., "Phone1")). Computing platform 310 may invoke a function of object 512 configured to write data to object 512, and may pass, via the function, the value (e.g., "Phone1_ver2") to object 512, which may store the value. Computing platform 310 may then populate a variable of object 512 with data (e.g., a timestamp) indicating a time when the value was stored in object 512. Computing platform 310 may then return to step 606 to wait for another request pertaining to the data stored in the database stored on database computing system 302.

In some embodiments, computing platform 310 may periodically compare the times at which objects stored on data cache computing system 306 were last updated to the times at which their corresponding fields were last updated in the database stored on database computing system 302. In such embodiments, responsive to a determination by computing platform 310 that a time at which an object corresponding to a particular field for a particular record was last updated (e.g., populated with a value) is earlier in time than a time at which a table, of the database stored on database computing system 302, comprising the particular field for the particular record was populated with a different value, computing platform 310: may identify, from amongst the plurality of objects stored on data cache computing system 306, the object corresponding to the particular field for the particular record; and may store, in the object corresponding to the particular field for the particular record, the different value. For example, responsive to a determination by computing platform 310 that the time indicated by the variable of object 512 (e.g., the time corresponding to when object 512 was populated with the value (e.g., "Phone1_ver2") in step 616 above is earlier in time than a time at which the field corresponding to column B3 for the record in table 404 having the value "###1" for the field corresponding to column B1 was populated with a different value (e.g., "Phone1_ver3"), computing platform 310: may identify object 512 and store in object 512 the different value (e.g., "Phone1_ver3").

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
    at a computing platform comprising at least one processor, a communication interface, and a memory:
        receiving, via the communication interface, data identifying one or more sets of fields of a database;
        for each record of a plurality of records of the database:
            instantiating, by the at least one processor, one or more objects corresponding to the one or more sets and comprising values stored in the fields for the record; and
            storing, in the memory, amongst a plurality of objects associated with the database, the one or more objects;
        receiving, via the communication interface, a request to store a value to a particular field of the one or more sets for a particular record of the plurality of records;
        storing, by the at least one processor, in a table of the database, the value in the particular field for the particular record;
        identifying, by the at least one processor, from amongst the plurality of objects, a first object corresponding to the particular field for the particular record;
        storing, by the at least one processor, in the first object corresponding to the particular field for the particular record, the value;
        storing, by the at least one processor, in the first object corresponding to the particular field for the particular record, data indicating a time at which the first object corresponding to the particular field for the particular record was populated with the value; and
        responsive to a determination by the at least one processor that the time at which the first object corresponding to the particular field for the particular record was populated with the value is earlier in time than a time at which the table of the database having the particular field for the particular record was populated with a different value:
            identifying, by the at least one processor, from amongst the plurality of objects, the first object corresponding to the particular field for the particular record; and
            storing, by the at least one processor, in the first object corresponding to the particular field for the particular record, the different value.

2. The method of claim 1, wherein instantiating the one or more objects comprises instantiating second object for the record.

3. The method of claim 2, wherein instantiating the second object for the record comprises instantiating, for each set of the one or more sets, a third object for the corresponding set of the one or more sets.

4. The method of claim 3, wherein instantiating the third object for the corresponding set of the one or more sets comprises instantiating, for each field of the corresponding set of the one or more sets, a fourth object for the field.

5. The method of claim 4, comprising populating, by the at least one processor, the fourth object for the field with a value stored in the field for the record.

6. The method of claim 5, comprising populating, by the at least one processor, the fourth object for the field with data indicating a time at which the fourth object for the field was populated with the value.

7. The method of claim 1, comprising, for each record of the plurality of records:
    populating, by the at least one processor, a second object, of the one or more objects, that corresponds to the record with a value corresponding to the record; and
    for each set of the one or more sets:
        populating, by the at least one processor, a third object, of the one or more objects, that corresponds to the set with the value corresponding to the record; and
        populating, by the at least one processor, for each field of the set, a fourth object, of the one or more objects, that corresponds to the field, with the value corresponding to the record.

8. The method of claim 7, wherein for each record of the plurality of records:
    the second object that corresponds to the record comprises, for each set of the one or more sets, the third object that corresponds to the set; and
    for each set of the one or more sets:
        the third object that corresponds to the set inherits, from the second object that corresponds to the record, the value corresponding to the record and comprises, for each field of the set, the fourth object that corresponds to the field; and
        for each field of the set, the fourth object that corresponds to the field inherits, from the third object that corresponds to the set, the value corresponding to the record.

9. The method of claim 1, comprising:
    receiving, via the communication interface, from a computing device, a request for a value stored in a particular field of the one or more sets for a particular record of the plurality of records;
    identifying, by the at least one processor, from amongst the plurality of objects, a second object comprising the value; and
    communicating, via the communication interface, to the computing device, the value.

10. The method of claim 9, wherein identifying the second object comprising the value comprises identifying, based on data in the request, a third object corresponding to the particular record, the third object corresponding to the particular record comprising multiple objects each of which corresponds to a different set of the one or more sets.

11. The method of claim 10, wherein identifying the second object comprising the value comprises identifying, from amongst the multiple objects, a fourth object corresponding to a set, of the one or more sets, comprising the particular field, the fourth object corresponding to the set comprising a fifth object corresponding to the particular field, the fifth object corresponding to the particular field comprising the value.

12. The method of claim 11, comprising invoking, by the at least one processor, a function, of the fifth object corresponding to the particular field, configured to return the value.

13. The method of claim 1, wherein identifying the first object corresponding to the particular field for the particular record comprises identifying, based on data in the request, a second object corresponding to the particular record, the second object corresponding to the particular record comprising multiple objects each of which corresponds to a different set of the one or more sets.

14. The method of claim 13, wherein identifying the first object corresponding to the particular field for the particular record comprises identifying, from amongst the multiple objects, a third object corresponding to a set, of the one or more sets, comprising the particular field, the third object corresponding to the set comprising the first object corresponding to the particular field for the particular record.

15. The method of claim 14, comprising:
  invoking, by the at least one processor, a function, of the first object corresponding to the particular field for the particular record, configured to write the value to the first object corresponding to the particular field for the particular record; and
  passing, by the at least one processor, via the function, the value to the first object corresponding to the particular field for the particular record.

* * * * *